United States Patent Office 2,996,657
Patented Aug. 15, 1961

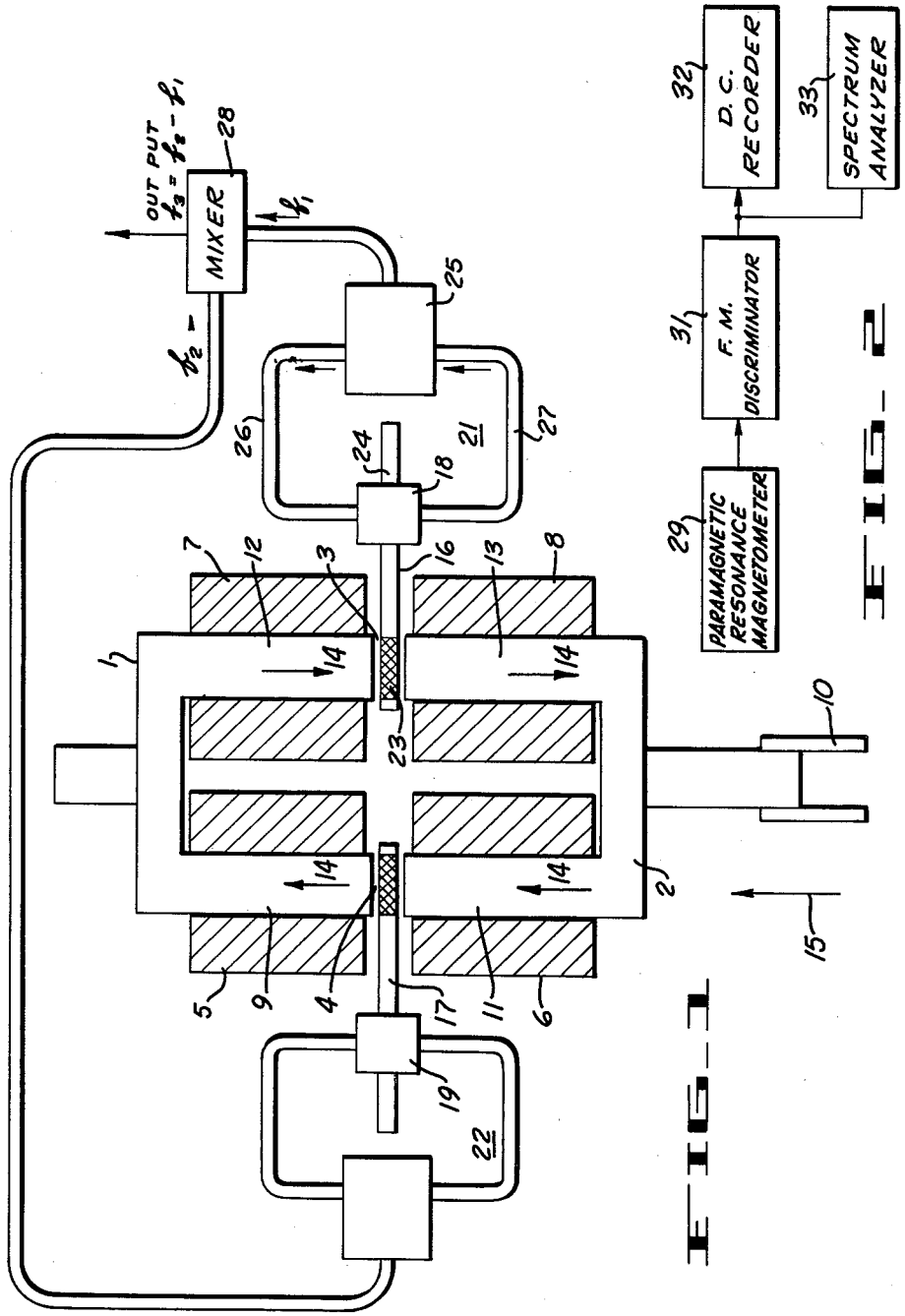

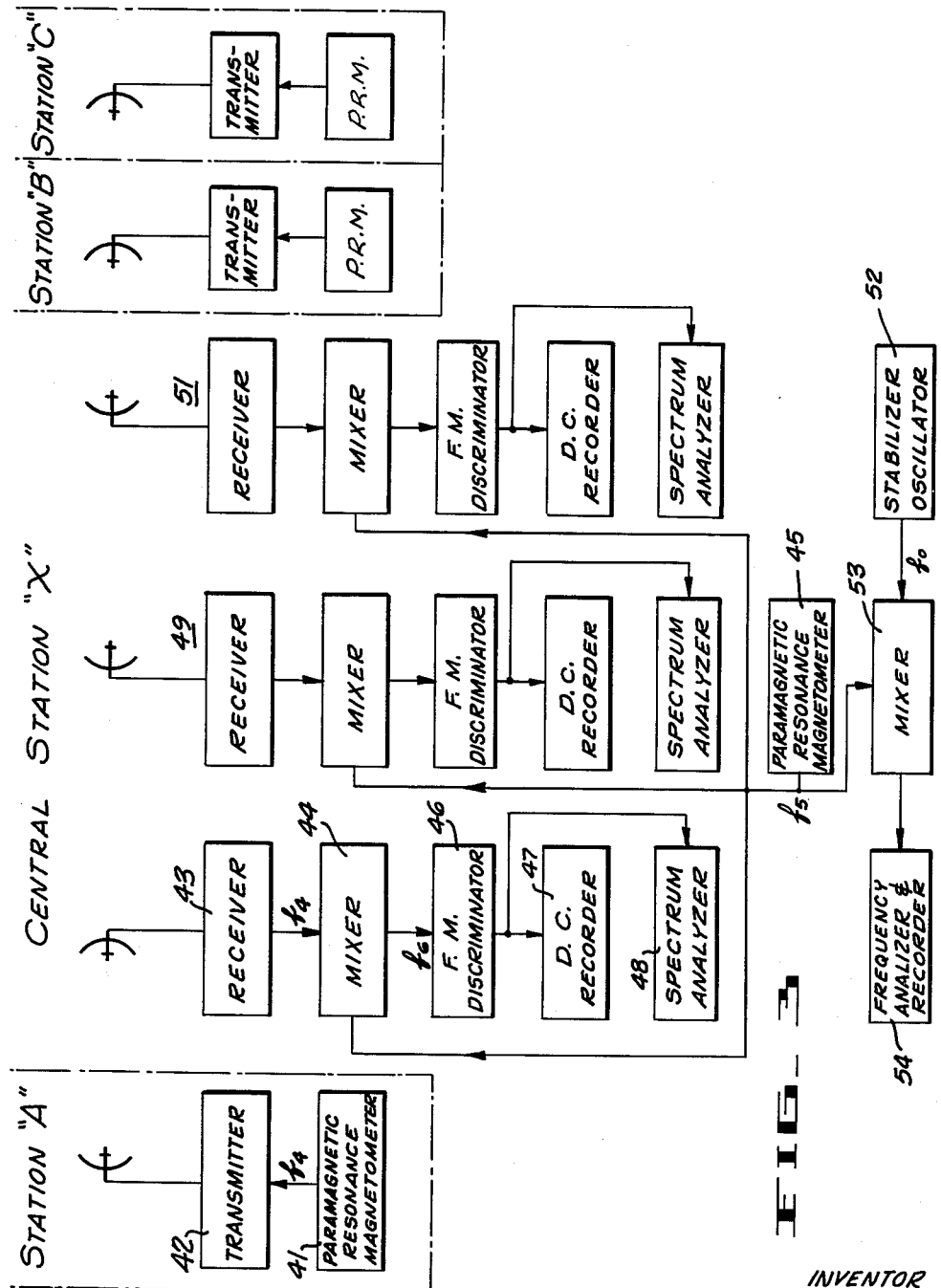

2,996,657
GYROMAGNETIC RESONANCE MAGNETOMETER AND GRADIOMETER APPARATUS AND METHOD
Russell H. Varian, Cupertino, Calif., assignor to Varian Associates, San Carlos, Calif., a corporation of California
Filed Feb. 8, 1954, Ser. No. 408,845
4 Claims. (Cl. 324—.5)

This invention relates in general to magnetic field and magnetic field gradient measuring methods and apparatus and, more particularly, to novel methods and apparatus for determining the magnitude and frequency of extremely small fluctuations or perturbations in magnetic fields with time such as, for example, perturbations in the earth's magnetic field with time and for determining differences in the fluctuations at different points in the magnetic field whereby anomalies in these fluctuations caused by differences in the physical properties of the earth over its subsurface may be detected and utilized for obtaining geophysical information.

The earth's magnetic field is not constant with time but, over a major portion of the time, fluctuates. Certain of these fluctuations are the better known very slow secular variations, solar diurnal variations and lunar diurnal variations while other fluctuations are more rapid and of the order of a few parts in $10^6$ or more in magnitude. The causes of these rapid fluctuations are not completely known but the correlation between auroral displays and magnetic storms leads one to suspect that these rapid fluctuations in the earth's magnetic field may be caused by disturbances produced by showers of charged particles entering the upper atmosphere of the earth. It is suspected that the disturbances may be fifty miles or so above the earth where the aurora ends, and may be influenced by currents set up in the Heaviside layer which is also of comparable altitude. Thus, the magnetic disturbances would be distributed uniformly over areas on the earth's surface comparable to about fifty miles and would produce rapid field fluctuations of equal magnitude and frequency over the area assuming that the electrical conductivity and magnetic susceptibility of the earth's crust were uniform. But since this uniformity in the earth's crust does not exist over such a large area, the disturbances produce fluctuating magnetic fields which are non-uniform over the earth's surface although produced by the same atmospheric disturbances. Any measurement of these differences in the field fluctuations at a plurality of different points on the earth's surface would be a means for determining differences in electrical conductivities and magnetic susceptibilities of formations below the earth's surface.

These magnetic field fluctuations caused by disturbances originating in the upper atmosphere penetrate into the earth's surface to a depth which is determined by the well-known skin depth theory which sets the boundaries in depth to which currents can be induced in a conductor. This distance or depth is inversely proportional to the square root of the frequency of the field and also is inversely proportional to the square root of the electrical conductivity of the earth's subsurface. In order for these perturbations in the magnetic field to descend a distance of approximately 10,000 feet in a formation of earth's crust of, for example, an oil formation containing salt water, a frequency of perturbation of about ⅕ of a cycle per second would be necessary. The fluctuations of the earth's magnetic field actually existing comprise all frequencies from thousands of cycles per second down to frequencies much lower than ⅕ cycle per second and, if the frequencies at which these disturbances accur can be determined the amount of overlying conductivity can be measured and this may roughly correlate with depth. In order to accomplish the results desired, a method and means would preferably be capable of measuring the earth's magnetic field to one part in $10^8$ or better and it should also be capable of determining the frequency of fluctuation of the earth's field from at least a few hundred cycles per second down to a fraction of a cycle per second.

One object of the present invention is to provide a novel method and apparatus for measuring the strength of an unknown magnetic field, such as the earth's field, which method utilizes gyromagnetic resonance.

Another object of the present invention is to provide a novel method and means for detecting minute fluctuations in a relatively strong magnetic field such as, for example, the earth's magnetic field.

Another object of the present invention is to provide a novel method and means for detecting minute fluctuations in the magnitude of a relatively strong magnetic field such as, for example, the earth's magnetic field, wherein the fluctuations in magnitude are indicated by the variations in the frequency output of a radio frequency system.

Still another object of the present invention is to provide a novel method and apparatus as set forth in the immediately preceding two objects wherein the frequencies and magnitudes of the fluctuations may be readily determined.

Still another object of the present invention is to provide a novel method and apparatus for comparing relative changes in the minute fluctuations in a magnetic field, such as, for example, the earth's magnetic field, at different locations within the field, or separate places on the earth's surface whereby anomalies in the physical properties of the earth's crust may be indicated.

Another object of the present invention is to provide a novel method and apparatus whereby the fluctuations outlined in the immediately preceding object are indicated by fluctuations in the frequency output of a radio frequency source and wherein the relative changes in the fluctuations are also indicated by the frequency output of a radio frequency system.

A further object is to provide a highly sensitive field measuring device capable, for example, of measuring the earth's field to one part in $10^8$ or better.

Other objects and advantages of the present invention will become apparent from a perusal of the following specification and claims taken in connection with the accompanying drawings wherein, FIG. 1 is a diagrammatic view of a novel gyromagnetic resonance device which will produce a radio frequency output, the frequency of which is proportional to the amplitude of the earth's magnetic field at the point on the surface of the earth at which this device may be located, FIG. 2 is a block diagram of a novel gyromagnetic resonance system which includes the apparatus shown in FIG. 1 to produce a permanent record over periods of time of the strength and frequency of the fluctuations, FIG. 3 is a block diagram of a novel electronic system wherein the radio frequency energy output from a plurality of gyromagnetic devices of the type disclosed in FIG. 1 which are located at randomly selected positions along the earth's surface are transmitted to a central station where the different frequency outputs may be compared and their differences noted and recorded.

Referring now to FIG. 1 there is shown a novel magnetic field measuring device which comprises a pair of magnetic cores 1 and 2 of, for example, permalloy or a suitable ferromagnetic material, each being substantially Y-shaped as shown. The divided-leg portions of these two cores are diametrically aligned so that two small air gaps 3 and 4 are produced therebetween. Solenoids 5, 6, 7 and 8 encircle legs 9, 11, 12 and 13, respectively, of the two cores, the solenoids being identical and carrying identical direct currents so as to produce identical flux intensities in each of the legs in the directions indicated by the arrows 14. Thus magnetic fields of identical intensities are produced across the two gaps 3 and 4 due to the direct current flow in the solenoids, the field in the left-hand gap 4 being directed upwardly as shown in FIG. 1 while the field in the right-hand gap 3 is directed downwardly. This apparatus when positioned in a unidirectional magnetic field (such as, for example, the earth's magnetic field) having the direction represented by the arrow 15 also has a flux produced in the two cores 1 and 2 proportional to this magnetic field. Hereafter this magnetic field will be assumed to be the earth's magnetic field to facilitate the description. This latter flux in the core may be as high as one hundred times the flux of the earth's magnetic field due to the field intensifying properties of the core and this magnification may be varied such as by use of a permalloy sensitivity adjustment 10. Thus, magnetic fields of equal strength are produced across the two gaps, both in the direction of arrow 15, which are proportional to the earth's magnetic field. In the left-hand gap, the field due to the earth's field adds to that due to the solenoid while, in the right-hand gap, the field due to the earth's field subtracts from the field due to the solenoid.

Positioned in each of these gaps 3 and 4 is one side arm 16 and 17 of a pair of magic T's or hybrid junctions 18 and 19. Each of these magic T's forms a part of the feedback circuit of an associated oscillator 21 and 22 of a type such as that disclosed in U.S. patent application, Serial No. 367,538, filed July 13, 1953, by Marvin Chodorow and Russell H. Varian, entitled "Gyromagnetic Resonance Apparatus," now U.S. Patent No. 2,894,209, granted July 7, 1959. One of these oscillators will be described, that on the right-hand side in FIG. 1, and it is to be understood that the other oscillator is identical.

Positioned in the side arm 16 within the associated field gap 3 is a small volume 23 of a gyromagnetic substance of the paramagnetic class such as alkali metal in ammonia or diphenyl-picryl-hydrazyl. The other side arm 24 of the magic T 18 is a dummy load which is used to balance the magic T before gyromagnetic resonance occurs in the other side arm 16. With noise present at the Larmor frequency of the gyromagnetic substance in the side arm 16, gyromagnetic resonance occurs in side arm 16 resulting in an unbalancing of the magic T. When the magic T 18 is unbalanced, a portion of the output from the associated microwave amplifier 25, which, for example, may be a two cavity klystron, is transmitted through one arm 26 of the magic T and through the other arm 27 of the magic T back to the amplifier input to thereby provide a feedback circuit to the amplifier which will then oscillate. The frequency at which self-oscillations will occur is determined by the strength of the magnetic field across the gap 3, this strength determining the frequency of gyromagnetic resonance of the electrons in the paramagnetic substance 23, and this frequency in turn determining the oscillation frequency of the oscillator. The frequency of oscillation is composed of the frequency due to the solenoid induced field plus the frequency due to the earth's field. As the strength of the magnetic field across the gap 3 changes due to earth's field fluctuations, the gyromagnetic resonance frequency of the electrons in substance 23 changes proportionally and thus the oscillating frequency of the oscillator 21 changes. The explanation of how this is accomplished is set forth in the above cited patent application.

The radio frequency output $f_1$ from the right-hand oscillator 21 will be different than the radio frequency output $f_2$ from the left-hand oscillator 22 since the magnetic field across the left-hand gap 4 is stronger than the magnetic field across the right-hand gap 3. As the earth's field fluctuates, the magnetic fields across the gaps 3 and 4 also vary, one field increasing as the other decreases and vice versa depending on whether or not the earth's field is increasing or decreasing at any instant of time. Therefore, the frequency difference of these radio frequency oscillators is proportional to the earth's field, and if the earth's field varies, the beat frequency between these two oscillators will be frequency modulated with the variation function whatever it may be. The difference in the frequency output of the two oscillators 21 and 22 may be easily obtained by supplying the output from each of these oscillators to a mixer 28 where the two frequency signals $f_2$ and $f_1$ are caused to "beat," the value of this difference or beat frequency $f_3$ being proportional to the strength of the earth's magnetic field and the variations in this beat frequency being correlative with the magnitude of the fluctuations of the earth's magnetic field at the point on the earth's surface at which the apparatus is located.

To give a concrete example, the gyromagnetic resonance frequency of electrons in a typical paramagnetic substance is $3.6 \times 10^6$ cycles per second per gauss. Since the earth's field is approximately ½ gauss and since the ferromagnetic core increases it by, say, a factor of 100, the gyromagnetic resonance frequency in each paramagnetic substance due to the earth's field is $3.6 \times 10^6 \times 50$. Since the gyromagnetic frequency in each substance due to the field produced by the solenoids cancel out in the mixer, the difference frequency or output $f_3$ from the mixer is twice the gyromagnetic resonance frequency in each arm due to the earth's field. Thus, in this illustration, the output frequency from the mixer will be $3.6 \times 10^6 \times 50 \times 2$ or $3.6 \times 10^8$ cycles/sec. If the minimum variation due to the fluctuating field is assumed to be one part in $10^8$, the minimum frequency change will be 3.6 cycles per second and if the maximum field change is assumed to be 3 parts in $10^6$, the maximum frequency change will be about $11 \times 10^2$ cycles/sec. Therefore, the frequency excursion in the mixer will swing about $3.6 \times 10^8$ cycles ± at least 3.6 cycles.

It should be noted that the results are given in terms of frequency and changes in frequency which are a great deal more accurate and reliable than readings in current, voltage and the like.

Referring to FIG. 2, wherein the apparatus in FIG. 1 is represented by the block 29, the output from the mixer circuit may be transmitted to an F.M. discriminator 31 where the frequency variations are transposed into voltage variations, the voltage output being transmitted to an indicator such as an oscilloscope for immediate visual examination. The output may be transmitted to a recorder 32 of well known operation where a continual record on graph paper or magnetic tape of the voltage variation as a function of time is obtained. The recorded signal is proportional to the magnitude of the earth's magnetic field and variations in the recorded signal level will follow the fluctuations in the earth's field. The output from the F.M. discriminator 29 may also be transmitted to a harmonic or spectrum analyzer 33 where the signal may be frequency analyzed or the recorded tape may be fed to another type harmonic analyzer. The latter method is very convenient in that the amount of field equipment is reduced and also the tape recording may be rapidly analyzed since the recorded frequencies are low and the tape may be greatly speed up through the analyzer. Thus the frequency of the different components which make up the small fluctuating portion of the earth's field may be determined.

By the use of two or more of the above described apparatus shown in FIG. 1, the earth's magnetic field including the fluctuating portions at two or more points may be determined and compared. The differences in the fluctuating fields noted between the two or more locations serve to reveal the make up of the earth's surface crust since the anomalies in the fluctuating field between points are due to the differences in electrical conductivity and magnetic susceptibility in the rock formations, etc. Referring to FIG. 3, a plurality of gyromagnetic resonance apparatus similar to that shown in FIG. 1 are located at a plurality of positions on the earth's surface at some distance apart, for example, 1000 yards, and these apparatus will produce radio frequency signals in the same manner as the above described apparatus in FIG. 1. The frequency outputs of these mixers are proportional to the intensity of the earth's field at their respective locations. Now, if it is assumed that the earth's surface is uniformly homogeneous across this 1000 yard space, then the earth's field including the fluctuating portions at these points would be identical and the radio frequency output from the mixers at the plurality of localities would be identical at all instants of time. But the magnetic field fluctuations at these different locations will be different if the earth's surface is inhomogeneous and their differences will be directly related to the inhomogeneities which are caused by the differences in conductivities and susceptibilities in the earth's surface. Thus the radio frequency output from the mixer at one location will be of a different frequency than the radio frequency output from the similar mixer at a second location and the differences in these two frequencies is a measure of the differences in the earth's magnetic field fluctuations at the two points and is thus a measure of the difference in the conductivity and susceptibility of the earth at such locations.

The apparatus necessary to accomplish the above described results includes at each substation A, B, etc. a paramagnetic resonance magnetometer 41 such as that shown in FIG. 1. The output $f_4$ from the associated mixer circuit at substation A is transmitted through a transmitter 42 which includes an amplifier and a microwave modulator for supplying a carrier frequency for the signal $f_4$. The modulated carrier signal is then transmitted to the central station X where it is picked up and transmitted through a receiver 43 which includes a demodulator circuit, the output of the receiver 43 being the $f_4$ frequency signal. This signal $f_4$ is transmitted to a mixer 44. Located at the central station X is another paramagnetic resonance magnetometer 45 of the type shown in FIG. 1. The radio frequency signal $f_5$ from the associated mixer of this magnetometer 45 is transmitted to the mixer 44 where the two frequency signals $f_4$ and $f_5$ are beat. The output from this mixer 44 is the difference frequency $f_6$ between $f_4$ and $f_5$ and this difference frequency is transmitted to an F.M. discriminator 46 which gives a voltage which is proportional to the difference frequency $f_6$. This signal output from the mixer 44 is a measure of the difference in fluctuating magnetic field at the two stations A and X. The earth's field at the central station may vary by as much as 1% from the earth's field at another station so that the difference frequency may be in the neighborhood of plus or minus 3.6 megacycles in addition to the frequency difference due to the differences in the fluctuating fields at the two locations. The D.C. voltage output from the discriminator 46 is transmitted to a recorder 47 for permanent recording such as magnetic tape and may also be transmitted to a harmonic analyzer 48 for frequency analysis or the magnetic tape may be fed to a harmonic analyzer with the resultant advantages noted above.

Similar receiving and recording apparatus is located at the central station for each added substation B, C, etc. and this apparatus is disclosed in FIG. 3, apparatus 49 and 51 being associated with substations B and C, respectively. The difference between field fluctuations at the central station X and at each of the substations may thus be obtained and a contour map of the differences may be constructed for geophysical prospecting utilization.

This central station X serves as a reference standard for station A and the other substations B, C, etc. It is therefore desired to have a record of the field fluctuations at the central station with which the difference record may be compared. This is accomplished by providing a stable oscillator 52 at the central station X which produces a constant fixed frequency $f_0$. This frequency $f_0$ and the frequency $f_5$ produced by the paramagnetic resonance magnetometer 45 at the central station are beat in the mixer 53, the output of which is transmitted to a frequency analyzer and recorder 54 so that fluctuations in the earth's field at station X may be recorded and analyzed.

This method and apparatus, although described with reference to the measurement of the earth's field fluctuations due to naturally occurring disturbances such as storms and the like, is equally applicable for detecting and measuring changes in fields, such as the earth's field, caused by other circumstances. For example, this invention may be employed to detect the movement of bodies such as vehicles, ships, submarines, etc., since these objects cause changes in the earth's magnetic field in their vicinity.

Various modifications and variations may be made in the described method and apparatus without departing from the spirit of the invention; for example, the disclosed method might be carried out with field measuring instruments other than the novel paramagnetic magnetometer described although the latter is deemed preferable because of its high degree of sensitivity. Consequently, the foregoing description is to be considered purely as exemplary and not in a limiting sense.

What is claimed is:

1. A method for indicating anomalies in the physical properties of the earth's crust which comprises the steps of detecting the naturally occurring time variations in the earth's magnetic field simultaneously at spaced points, converting said field changes into frequency variations in the operating frequency of an alternating frequency oscillator at each of said points, said operating frequency changing as a function of the strength of the magnetic field, measuring the difference in said frequency variations between said spaced points, measuring the amount of frequency variation from a predetermined value at one of said spaced points, and comparing said difference in frequency variations between said spaced points with the amount of frequency variation from said predetermined value.

2. Apparatus for determining the difference between the earth's rapidly fluctuating magnetic field at a plurality of locations comprising means for measuring the magnetic fields uninterruptedly at said locations and for converting the field strength measurements to radio frequency signals, the radio frequency of said signals varying as the earth's field fluctuates, means comprising a radio frequency mixer system wherein the radio frequency signals from said locations are mixed for obtaining a continuous record of the changing difference in radio frequencies between the radio frequency signals produced at said locations, and means for recording the continuous radio frequency signal produced as a measure of the earth's field strength at said reference station for use as a reference in analyzing the fluctuating difference in radio frequency signals between the radio frequencies produced at said locations.

3. Apparatus for indicating anomalies in the physical properties of the earth's crust which comprises means for detecting the naturally occurring fluctuations in the earth's magnetic field at spaced locations and for converting said magnetic field time fluctuations at each of said locations into radio frequency variations in a radio frequency signal, and means for determining the differences in said radio frequency variations between the radio frequency signals from each of said locations, one of said locations being a reference station having means thereat including a source of stable radio frequency signal with which to compare the varying radio frequency signal produced due to the fluctuating earth's magnetic field at said reference location.

4. Apparatus as claimed in claim 3 wherein said means includes a mixer system to which the stabilized radio frequency is transmitted and to which the varying radio frequency signal produced as a result of the fluctuating earth's magnetic field is also transmitted, the output of said mixer being a radio frequency signal depicting the magnetic field variations at said reference location from a selected normal value.

References Cited in the file of this patent

UNITED STATES PATENTS

| | | |
|---|---|---|
| Re. 23,769 | Varian | Jan. 12, 1954 |
| 2,407,536 | Chapman | Sept. 10, 1946 |
| 2,480,265 | Rubenstein | Aug. 30, 1949 |
| 2,485,931 | Slonzewski | Oct. 25, 1949 |
| 2,519,094 | Zuschlag | Aug. 15, 1950 |
| 2,589,494 | Hershberger | Mar. 18, 1952 |
| 2,677,801 | Cagniard | May 4, 1954 |
| 2,720,625 | Leete | Oct. 11, 1955 |
| 2,845,595 | Leete | July 29, 1958 |

OTHER REFERENCES

"Exploration Geophysics," by Jakosky, 1940, 1950, sec. edit., 4th impression, pp. 149–156.

Pound et al.: Review of Scientific Instruments, vol. 21, No. 3, March 1950, pp. 219–224.